April 24, 1962

R. C. GOODWIN 3,031,039

AUTOMATICALLY REGULATED FRICTION BRAKE
CONTROL SYSTEM FOR CENTRIFUGAL
MACHINES AND THE LIKE

Filed Aug. 25, 1958

INVENTOR
RALPH C. GOODWIN
BY
Pollard, Johnston, Stapler & Robertson
ATTORNEYS

April 24, 1962

R. C. GOODWIN 3,031,039

AUTOMATICALLY REGULATED FRICTION BRAKE
CONTROL SYSTEM FOR CENTRIFUGAL
MACHINES AND THE LIKE

Filed Aug. 25, 1958

INVENTOR
RALPH C. GOODWIN
BY
ATTORNEYS

United States Patent Office 3,031,039
Patented Apr. 24, 1962

3,031,039
AUTOMATICALLY REGULATED FRICTION BRAKE CONTROL SYSTEM FOR CENTRIFUGAL MACHINES AND THE LIKE
Ralph C. Goodwin, Hamilton, Ohio, assignor to The Western States Machine Company, Hamilton, Ohio, a corporation of Utah
Filed Aug. 25, 1958, Ser. No. 756,848
11 Claims. (Cl. 188—181)

This invention relates to a friction brake control system intended primarily for use in the braking or deceleration of heavy rotating bodies, such as, high speed sugar centrifugals and other heavy duty machines which operate in a cyclical manner with frequent accelerations and decelerations to and from high speeds of rotation, and more particularly is directed to a friction brake which is fluid pressure operated and has a control system including a device or devices for regulating the pressure supplied to the fluid pressure operated brake so as to maintain a substantially uniform adjustable braking force under varying operating conditions.

The friction brakes of high speed centrifugals, as heretofore made and used, have been applied by the force of springs or of liquid or air under pressure, with such force being intended to exert an approximately uniform braking torque on the revolving mass from the start to the end of each braking period. Since the braking operation involves the conversion of a great deal of kinetic energy into heat through the friction of the brake, the friction brakes of high speed centrifugals usually include water cooling systems. However, it has been found that unavoidable variations occur in the temperatures of the brake cooling water, and that such temperature variations result in significant changes in the brake efficiency and, consequently, in the braking torque and the time required for decelerating the centrifugal basket from a predetermined speed to standstill.

Further, in the existing fluid pressure operated friction brake systems for centrifugals and the like, any variations in the pressure at the source of the operating fluid would produce corresponding variations in the braking effect, so that it is customary to include a pressure regulator in the fluid pressure supply line. Although the pressure regulator is adjustable in order to vary the fluid pressure supplied to the friction brake system, such variation of the pressure must be effected manually prior to the commencement of the braking operation so that a uniform pressure is available throughout the braking operation without regard to the requirement for more or less pressure in order to obtain a uniform braking force or torque as the operating conditions and the brake efficiency vary during the braking operation. More specifically, it is known that the braking torque for a given applying force is largely a function of the brake drum and lining temperatures so that, as such temperatures tend to increase during the braking period, the braking torque decreases for a constant brake applying force and the braking time is greater than it would be if the initial braking torque could be maintained throughout the braking period.

Further, in friction brake systems for use in the braking or deceleration of heavy rotating bodies, such as, high speed sugar centrifugals, the brake lining characteristics change considerably with wear so that, where such centrifugals operate in a cyclical manner, increasing periods of time are required for the successive braking operations. Similarly, where the centrifugals operate in a cyclical manner, the conditions of the successive cycles may vary, so that, if the fluid pressure for applying the friction brake is maintained at a uniform value, the braking time will vary in accordance with the different conditions of the successive cycles. However, in a plant operating the centrifugals or other machines in sequence, it is important that the times required for the several phases of each cycle in the successive machines will be uniform, so that the machines will remain in step, in order to obtain the maximum productivity from the equipment.

Accordingly, it is an object of this invention to provide a new and improved control system for friction brakes alleviating the problems described above by affording a more uniform, adjustable braking torque which is substantially independent of the condition of the brake linings, the pressure of the fluid supplied to the control system, and the temperature of the brake cooling water.

Another object is to provide a friction brake control system for high speed centrifugals and the like capable of applying an adjusted braking torque which is maintained more nearly constant throughout the braking operation, thereby to obtain a more linear speed versus time characteristic than with previously existing friction brake control systems.

Another object is to provide a friction brake control system wherein the force for applying the friction brake is automatically regulated during the braking operation in order to maintain a substantially uniform braking torque throughout the braking operation so that, by avoiding major variations in the braking torque as a result of the increasing temperature of the drum and lining during the braking period, a predetermined braking time can be achieved with a less severe application of the brakes than with the previously existing friction brake control systems, thereby to prolong the brake lining life.

A further object is to provide a friction brake control system for high speed centrifugals and the like operated in a cyclical manner and which is effective to achieve a uniform braking time, assuming equal loads in successive cycles, so that such centrifugals or the like can be used in sequence and will remain in step with each other in order to permit the most efficient utilization of the machine.

In accordance with an aspect of the invention, the fluid pressure for applying the friction brake of a high speed centrifugal or the like is automatically regulated to provide a more constant or uniform tangential braking force on the brake drum than is achieved with existing brakes of the described character, and such automatic regulation of the fluid pressure is effected by a valve which is actuated by an adjustable force measuring device interposed between at least one of the brake bands and the fixed anchor thereof.

In a preferred embodiment of the invention, the force measuring device for actuating the valve which regulates the fluid pressure includes two pivotally interconnected parts which are attached to the related brake band and the brake support stud, respectively and which are angularly displaced relative to each other by the braking reaction, and an adjustably loaded spring interposed between the pivotally interconnected parts to resist the angular displacement thereof by the braking reaction so that the relative angular displacement of the pivotally interconnected parts is a measure of the braking reaction and is effective to actuate the valve.

The above, and other objects, features and advantages of the invention, will be apparent in the following detailed description of illustrative embodiments thereof which is to be read in connection with the accompanying drawings, forming a part hereof, and wherein.

Figure 5:
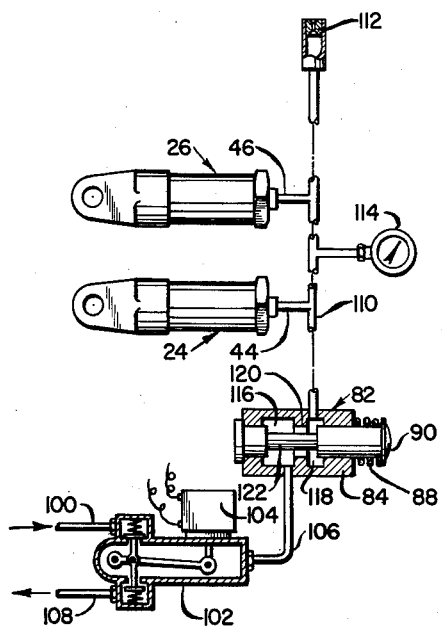
FIG. 5 is a schematic view, partly in section, of the automatically regulated brake control system applied to the heavy duty centrifugal machine of FIG. 1.

Referring to the drawings in detail, and initially to FIG. 1 thereof, it will be seen that the automatically regulated brake control system embodying the invention is there associated with a high-speed sugar centrifugal having a basket 10 suspended by a spindle 12 from a gyratory head supported below a framework 14. A motor 16 drives the spindle and basket assembly through intermediate connections which are not shown. A brake drum 18 rotates with the spindle and basket assembly and cooperates with the brake bands 20 and 22 (FIGS. 1 and 2) which have suitable friction linings.

The brake bands 20 and 22 are operated by cylinders 24 and 26, respectively, and the latter have clevis formations, at one end, which are pivotally mounted on brake support studs 28 and 30 depending from a hanger bracket 32 (FIG. 1) fixed above the brake drum 18. As shown in FIG. 2, each of the cylinders 24 and 26 has a piston 34 slidable therein and carrying a pin 36 which extends diametrically through axially elongated slots 38 in the wall of the cylinder to be received in a bracket 40 which is secured to the related brake band adjacent one end of the latter. A helical compression spring 42 is provided in each of the cylinders 24 and 26 and urges the related piston 34 axially in the direction away from the brake support stud, that is, in the direction for moving the related brake band to the "off" or released position. Fluid pressure, which is compressed air in the illustrated embodiment, is supplied to the ends of the cylinders 24 and 26 remote from the brake support studs 28 and 30 by way of feed lines 44 and 46, respectively, so that compressed air acting within the cylinders is effective to overcome the force springs 42 and move the pistons 34 in the directions for setting or applying the brake bands 20 and 22 against the brake drum 18.

The ends of the brake bands 20 and 22 remote from the brackets 40 are anchored to the brake support studs 30 and 28, respectively, as hereinafter described in detail, so that, when the brake bands are applied against the brake drum, as described above, the braking reaction is taken up by the brake support studs and by the hanger bracket 32 from which such studs depend. It will be apparent that the braking reaction taken up by each of the studs 28 and 30 consists of the frictional drag of the drum 18 on the lining of the related brake band and of a component of the brake applying force exerted by the related cylinder 26 or 24.

In accordance with the present invention, the pressure of the compressed air acting in the cylinders 24 and 26 for applying or setting the friction brake is automatically regulated in order to maintain an adjustably predetermined frictional braking force. The substantially uniform or constant adjusted braking force is maintained by measuring the braking reaction between one or more of the brake bands and the related brake support stud and by actuating a valve which controls the pressure, either directly or indirectly, in response to deviations of the measured braking reaction from an adjustably predetermined value.

Figure 1:
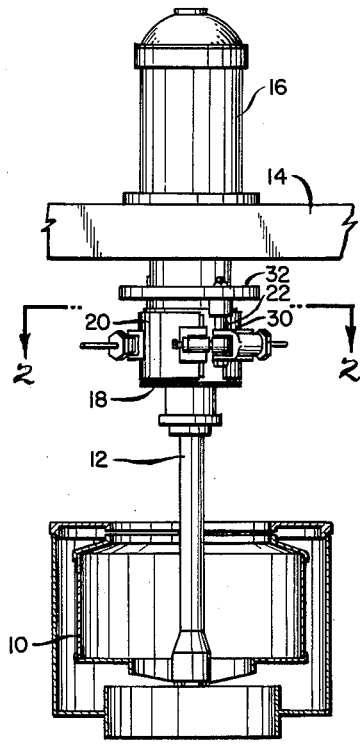
FIG. 1 is an elevational view, partly broken away and in section, showing a heavy duty centrifugal machine equipped with a friction brake having an automatically regulated brake control system according to an embodiment of the invention.
Figure 2:
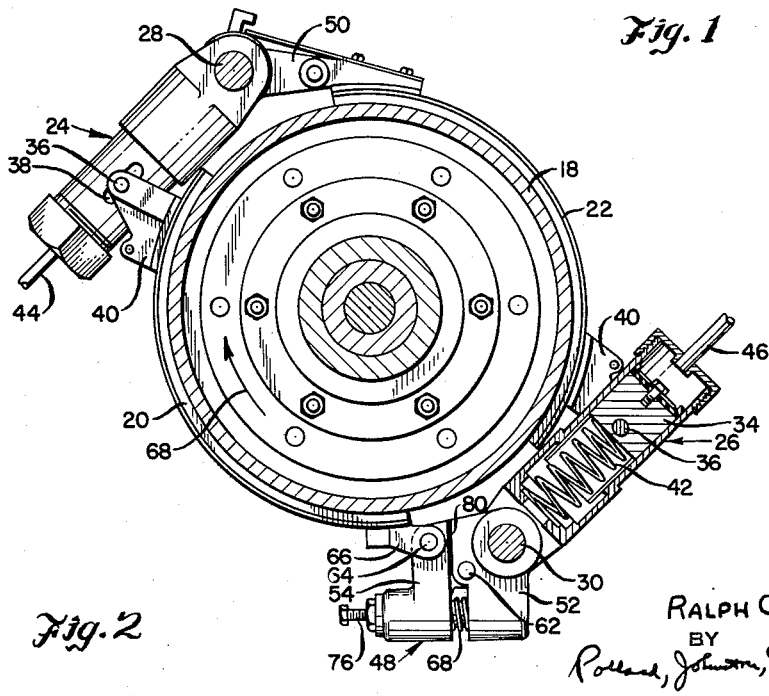
FIG. 2 is an enlarged horizontal sectional view taken along the line 2—2 of FIG. 1, and showing the braking members and the fluid pressure operated cylinders which apply the brake.

In the embodiment of the invention illustrated in FIGS. 1, 2 and 5, the braking reaction is measured only between the brake band 20 and its brake support stud 30, and such measurement of the braking reaction is then employed for regulating the pressure of the compressed air fed to both cylinders 24 and 26. The braking reaction is measured or sensed by a device which is generally identified by the reference numeral 48 and hereinafter described in detail, such device being connected between brake band 20 and its brake support stud 30, while the end of the brake band 22 remote from the bracket 40 is merely connected to the brake support stud 28 by way of a link 50.

Figure 3:
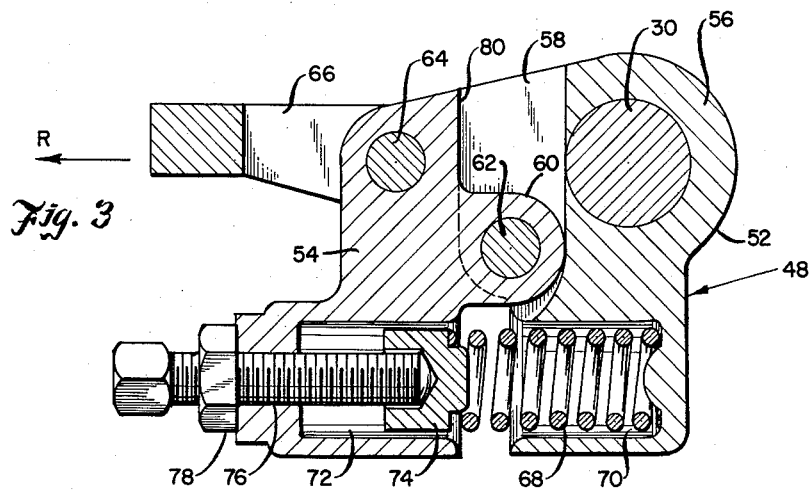
FIG. 3 is an enlarged sectional view taken along the line 3—3 of FIG. 4 and showing the interior construction of a force measuring device included in the automatically regulated brake control system of FIG. 1.
Figure 4:
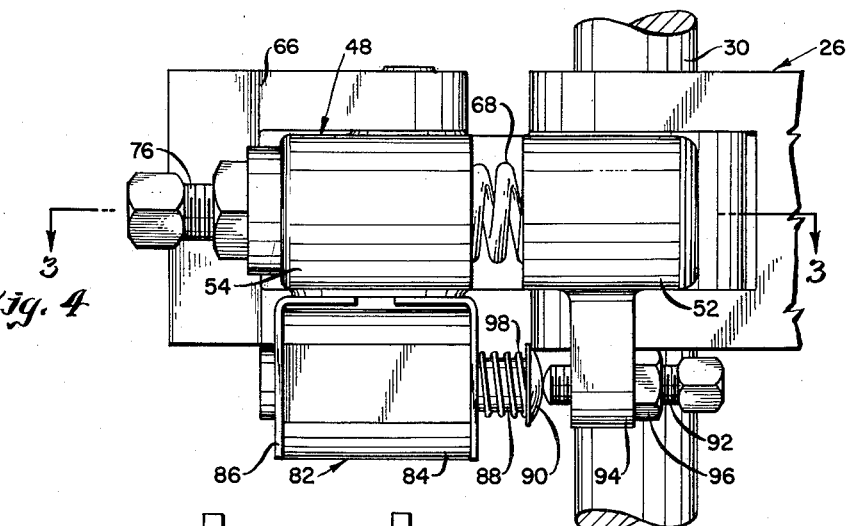
FIG. 4 is a side elevational view of the force measuring device of FIG. 3 and of the valve actuated thereby.

As shown in FIGS. 3 and 4, the force measuring device 48 includes two parts 52 and 54 which are pivotally interconnected for angular displacement relative to each other. The part 52 has a body 56 formed with a bore extending therethrough to receive the brake support stud 30 for mounting the part 52 on the brake support stud. Spaced apart ears 58 extend from body 56, and a lug 60 projecting from part 54 is received between the ears 58. The above mentioned pivotal interconnection of the parts 52 and 54 is achieved by a pivot pin 62 which has its axis parallel to the axis of the brake support stud 30 and is received in suitably aligned bores in the ears 58 and lug 60. The part 54 of force measuring device 48 is provided with a bore extending therethrough parallel to the axis of the pivot pin 62 and receiving a pivot pin 64 by which the part 54 is pivotally connected to a forked bracket 66 suitably secured to the end of brake band 20 remote from the bracket 40 on the latter.

As is apparent in FIG. 2, the pivot pin 64 is disposed in relation to the brake support stud 30 so that a plane passing through the axes of the pin 64 and stud 30 is generally parallel to the tangent to the surface of the brake drum 18 at the point where the bracket 66 is attached to the brake band 20. Thus, when the brake band 20 is applied against the surface of brake drum 18 by compressed air admitted to the cylinder 24 for frictionally braking the rotation of the centrifugal basket 10 in the direction of the arrow 68 on FIG. 2, the braking reaction passes substantially through the axes of the pin 64 and the stud 30, as represented by the arrow R on FIG. 3. Further, as is apparent in both FIGS. 2 and 3, the pin 62 which pivotally interconnects the parts 52 and 54 of force measuring device 48 is spaced outwardly with respect to the direction or line of action of the braking reaction R so that such braking reaction will tend to spread apart the axes of the pin 64 and the stud 30 and cause corresponding relative angular displacement of the parts 52 and 54 about the pivot pin 62.

The relative angular displacement of the parts 52 and 54 under the influence of the braking reaction is resisted by a helical compression spring 68 which is disposed with its axis extending generally parallel to the line of action of the braking reaction R, but at the opposite or outer side of the pivot pin 62. In order to receive the spring 68, the parts 52 and 54 of the device 48 are formed with blind bores 70 and 72 opening axially toward each other, with one end of spring 68 seating against the closed end of the bore 70 and the other end of spring 68 seating against an adjustable abutment member 74 which is movable axially within bore 72. The abutment member 74 is mounted on an adjustment bolt 76 which is screwed into bore 72 and carries a lock nut 78. In order to restrict the relative angular displacement of the parts 52 and 54, by the force of spring 68, the ears 58 of part 52 are formed with straight edges which, in the relative positions of the parts illustrated in FIGS. 2 and 3, abut against surfaces 80 of the part 54 at the opposite sides of the lug 60.

It will be apparent that the force exerted by spring 68 may be conveniently adjusted by rotation of the bolt 76, and that the parts 52 and 54 will be held in the relative angular positions illustrated in FIGS. 2 and 3, where the straight edges of ears 58 abut against the surfaces 80 of part 54, until the braking reaction R becomes sufficiently large to overcome the force of spring 68, whereupon part 54 of device 48 turns relative to part 52 in the counter-clockwise direction about pivot pin 62, as viewed in FIG. 3.

As previously mentioned, the relative angular displacement of the parts 52 and 54 under the influence of the braking reaction R is employed for actuating a valve which, either directly or indirectly, controls the pressure of the compressed air fed to cylinders 24 and 26 for applying the friction brake. As shown in FIG. 4, the valve, which is there generally identified by the reference numeral 82 includes a body 84 which is mounted in a bracket 86 suspended from the part 54, and a plunger or stem 88 extending from the body 84 and having a rounded head 90 which is engageable by an adjustable abutment screw 92 threaded through a lug 94 depending from the part 52 with a lock nut 96 being provided on the screw 92 for maintaining the latter in adjusted position relative to lug 94. The plunger 88 is urged to an extended position in the direction toward the abutment screw 92 by a spring 98 and the screw 92 is adjusted so that, when the parts 52 and 54 of device 48 are in the relative positions of FIGS. 2 and 3, head 90 of the valve plunger engages the abutment screw 92. The axes of the plunger 88 and of the abutment screw 92 lie substantially below, and in the vertical planes of the axes of the blind bores 72 and 70, respectively, of parts 54 and 52 so that, when the braking reaction R causes relative angular displacement of parts 52 and 54 in the direction for further compressing the spring 68, the housing 84 of valve 82 and the lug 94 supporting abutment screw 92 are moved relatively toward each other and the abutment screw acts on the head 90 of valve plunger 88 to retract the latter against the force of spring 98.

Referring to FIG. 5, it will be seen that the system for supplying compressed air to the brake operating cylinders 24 and 26 includes a supply line 100 extending from a source (not shown) of compressed air to a cut-off valve 102 which may be operated by a solenoid 104 and which has an air supply line 106 and a return or discharge line 108 extending therefrom. Although the illustrated solenoid operated valve 102 is arranged so that, when solenoid 104 is deenergized, as shown, the supply line 106 and the return or discharge line 108 are in communication with each other through valve 102, whereas, when solenoid 104 is energized, line 100 is communicated with line 106 to feed compressed air through the latter, and the return line 108 is closed, it is apparent that the connections of lines 100 and 108 to valve 102 may be reversed to feed compressed air through line 106 when the solenoid valve 102 is deenergized. The valve 82 is interposed between the supply line 106 and a line 110 which communicates with the lines 44 and 46 leading to the cylinders 24 and 26, to control the flow of compressed air from line 106 to line 110. A bleed orifice 112 opens from line 110 to the atmosphere so that the pressure of the air acting in cylinders 24 and 26 is controlled in accordance with the regulation of the flow of compressed air by the valve 82. A pressure gauge 114 is also preferably provided in communication with the line 110.

Although various valves may be used for controlling the flow of the compressed air fed through the line 110 and the lines 44 and 46 to the brake operating cylinders, the valve 82 used for that purpose is preferably a so-called "Beckett" air valve, as shown in FIG. 5. The body or housing 84 of valve 82 has two internal chambers 116 and 118 with which the lines 106 and 110 respectively communicate. An annular rim or flange 120 forms the separation between chambers 116 and 118 and defines a circular opening having substantially the same diameter as the plunger 88. The plunger 88 is formed, along a portion of the length thereof, with a reduced diameter section 122 so that, when the plunger 88 is in its extended position, as shown in FIG. 5, the reduced diameter section 122 of the plunger extends through the circular opening between chambers 116 and 118 and a radial clearance exists between rim 120 and section 122 through which air under pressure can flow from line 106 to line 110.

When plunger 88 is depressed or retracted into body 88, the reduced diameter section of the plunger moves toward the left, as viewed in FIG. 5, in relation to flange 120 and the relatively large diameter part of the plunger 88 approaches the circular opening defined by flange 120 and thereby progressively closes-off communication between chamber 116 and chamber 118. Thus, the axial displacement of plunger 88 of valve 82 controls the rate of flow of compressed air from line 106 into line 110. Since compressed air is continuously escaping from line 110 through bleed orifice 112, it is apparent that the pressure of the compressed air supplied through line 110 and lines 44 and 46 to the cylinders 24 and 26 is determined by the rate at which the valve 82 permits compressed air to flow from supply line 106 into line 110. Further, it is apparent that the instantaneous value of braking force, that is, the frictional resistance to rotation of brake drum 18, and the corresponding braking reaction will depend upon the pressure of the compressed air acting within cylinders 24 and 26. Thus, when solenoid 104 is energized for the purpose of applying the brake and the braking reaction R (FIG. 3) is initially less than the value for which the force of spring 68 has been adjustably set, the parts 52 and 54 of force measuring device are in the relative angular positions of FIGS. 2, 3 and 4, so that the plunger 88 of valve 82 is in its fully extended position, as shown in FIG. 5, and the flow of compressed air from line 106 through valve 82 to line 110 is relatively unimpeded to permit the pressure acting within the cylinders 24 and 26 to build-up towards full line pressure. When the braking reaction reaches the adjusted value, so that relative angular displacement of the parts 52 and 54 of force measuring device 48 is effected against the resistance of spring 68, such relative angular displacement causes retraction of plunger 88 of value 82, as previously described, and plunger 88 thereby restricts the rate of flow of compressed air from line 106 into line 110, thereby to maintain the pressure of the compressed air acting in cylinders 24 and 26 at the value required for the predetermined braking reaction corresponding to the adjustment of the force of spring 68. Thus, the device 48 senses the braking reaction and suitably actuates the valve 82 so that the air pressure acting in cylinders 24 and 26 is regulated for maintaining a substantially constant, adjusted braking force.

Although the control of the flow of compressed air by valve 82 regulates the pressure of air acting in cylinders 24 and 26 so that the braking reaction R sensed by the device 48 remains constant during the entire braking period, the fact that the braking reaction R includes a component of the brake applying force exerted by cylinder 24, as well as the frictional braking drag, means that, for a constant braking reaction R, increases in the brake applying force must be attended by decreases in the frictional braking drag. Thus, when the temperature of the drum 18 and the linings of bands 20 and 22 increases toward the end of a braking period to decrease the efficiency of the brake, so that the reaction R sensed by the device 48 is reduced, the brake control system embodying the invention acts to increase the pressure of air acting in cylinders 24 and 26 for correspondingly increasing the brake applying force until the braking reaction R is restored to its adjusted value. However, a part of the increase in the braking reaction R back to its adjusted value is formed by a component of the increased force exerted by the cylinder 24 so that the frictional braking drag and the braking torque are not maintained exactly uniform throughout the braking period and there is some slight non-linearity in the rate of braking toward the end of the braking period. Even such slight decrease in the braking torque and the corresponding non-linearity of the braking rate toward the end of the braking period obtained with the friction brake control system embodying this invention do not greatly detract from the advantages of such system over the existing friction brake control systems wherein a uniform air pressure acts in the brake applying cylinders throughout the braking period and there is no compensation for the decrease in braking efficiency resulting from the increasing temperature of the drum and linings toward the end of the braking period so that the decrease in braking torque and the non-linearity of the braking rate are relatively large. In any case, the variations in the braking force or toque permitted by the friction brake control system embodying this invention are relatively so small, that one is justified in referring to the braking force or torque as being maintained at a substantially constant adjusted value.

When the solenoid 104 is deenergized, as shown in FIG. 5, valve 102 interrupts the supply of air from line 100 and communicates line 106 with return or discharge line 108 so that the compressed air in cylinders 24 and 25 can escape rapidly through lines 44 and 46, line 110, valve 82 and line 106 as the springs 42 move the pistons 34 in the cylinders in the brake releasing directions.

Figure 6:
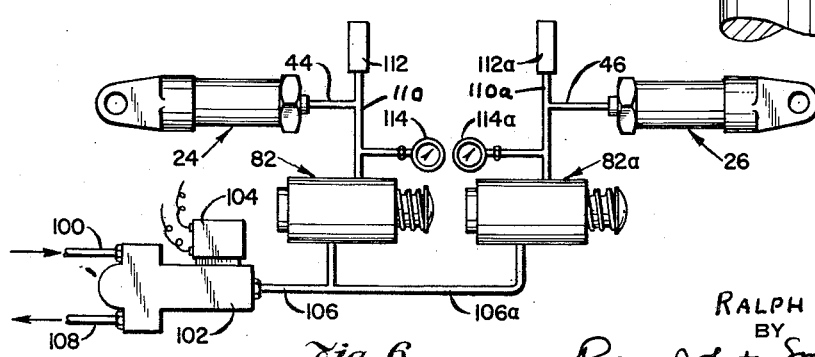
FIG. 6 is a schematic view similar to that of FIG. 5, but illustrating another embodiment of the invention.

In the above described embodiment of the invention, the braking reaction of only the brake band 20 is used for controlling the pressure of compressed air supplied to both cylinders 24 and 26, by way of a single force measuring device 48 and a single flow control valve 82 controlled thereby. However, it is to be understood that the link 50 attaching the brake band 22 to the brake support stud 28 may be replaced by a force measuring device and an associated flow control valve which are identical with the device 48 and valve 82, respectively, and the brake control system is then arranged so that the valve actuated by the force measuring device connected to brake band 20 indirectly controls the pressure of compressed air supplied to cylinder 24, while the other force measuring device and flow control valve indirectly regulate the pressure of compressed air supplied to the cyinder 26. Thus, as shown in FIG. 6, only the line 44 may extend from line 110 to the cylinder 24 so that the pressure of compressed air acting within the cylinder 24 is regulated by the control of air flow by valve 82 when the solenoid 104 of valve 102 is energized, while the compressed air for operating the cylinder 26 is supplied through a line 106a branching from the line 106 to a valve 82a, which is identical with the valve 82 but is actuated by a force measuring device (not shown) interposed between brake band 22 and stud 28, and which regulates the rate of flow of compressed air from line 106a into a line 110a from which the line 46 extends to the cylinder 26. The line 110a also has a bleed orifice 112a so that the pressure of the compressed air acting in cylinder 26 is dependent upon the rate of flow of air through valve 82a.

With the arrangement described above in connection with FIG. 6, the pressure of the compressed air supplied to each of the cylinders 24 and 26 is individually regulated in response to variations in the braking reactions of the related brake bands 20 and 22, respectively.

It will be apparent that, in the above described embodiments of the invention, the valve 82 (FIG. 5) or the valves 82 and 82a (FIG. 6) continuously adjust the rate of flow of the compressed air and thus, adjust the pressure of the compressed air admitted to the cylinders 24 and 26 during the braking operation so that the braking force or torque will be substantially maintained at the value determined by the adjustment of the spring 68 of each force measuring device 48. Thus, the automatically regulated friction brake control system embodying the invention ensures that a substantially uniform braking force or torque is applied for decelerating the basket 10 without regard to the condition of the brake linings or of the brake drum, so that a constant braking time is achieved for bringing the centrifugal basket to a standstill from a predetermined initial speed, assuming a uniform load in the basket. After the braking torque, and hence the braking time, have been initially determined by adjustment of the force of the spring 68 of each device 48, no further adjustment is required to maintain the uniform braking time even though the temperature of the brake drum may vary or the brake linings may become glazed with wear.

Further, it will be apparent that the substantially uniform braking torque and braking time determined by adjustment of the spring 68 of each force measuring device are not influenced by changes in the line pressure, that is, the pressure of the compressed air fed from the source through the line 100, so long as the line pressure is always at least as high as that required by the regulating system to provide the predetermined braking torque. Thus, there is no need to provide the usual pressure regulator in the line 100, and the full pressure from the source is always available for the braking action, if needed.

Since the braking time is maintained at a substantially constant adjusted value, at least that portion of each of the successive cycles of the centrifugal will require the same time for the completion thereof, so that the productivity of the centrifugal is increased over the usual situation where the braking times of successive cycles are of increasing duration by reason of the normal wear of the brake linings and the increased temperature of the brake drum. Since the braking times of the successive cycles remain uniform, it is apparent that centrifugals having friction brake control systems of the kind embodying the invention may be operated in sequence with the assurance that they will remain in step with each other, providing that the other phases of the operating cycles do not greatly vary between the successive cycles.

It is also to be noted that, by maintaining a more uniform braking torque from the beginning to the end of the braking operation, the automatically regulated brake control system embodying the invention makes it possible to effect the deceleration of the centrifugal basket or the like from a predetermined rotational speed to standstill in a given time with a smaller braking force than is required with existing friction brake control systems wherein a uniform fluid pressure is admitted to the brake operating cylinders throughout the braking operation so that the braking torque is at a maximum at the beginning of the braking operation and decreases substantially toward the end thereof by reason of the increased heating of the brake drum and linings toward the end of the braking operation. Since a given braking time can be achieved with a less severe application of the brake, it is evident that the life of the brake linings may be prolonged and the braking strain on the machine is reduced.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A braking system comprising a friction brake, compressed air operated means for applying said brake to develop a braking force dependent upon the pressure of the compressed air admitted to the brake applying means, means for supplying compressed air to said brake applying means including a supply conduit communicating with said brake applying means and having a constant area restricted opening to the atmosphere, and valve means interposed in said supply conduit in advance of said opening to the atmosphere to regulate the rate of flow of compressed air through said conduit and thereby control the pressure of the compressed air supplied to said brake applying means, and means responsive to the reaction to said braking force and actuating said valve means so that the latter controls the pressure of the compressed air supplied to the brake applying means in a manner to maintain said braking force at a predetermined value.

2. In a machine having a heavy rotary part, the combination of a brake drum rotatable with said rotary part, braking members frictionally engageable with said brake drum to exert a frictional braking force for decelerating said drum and heavy rotary part, fixed anchoring means, connecting means between said braking members and said anchoring means so that the latter absorb the reaction to said braking force, fluid pressure operated means for engaging said braking members with said brake drum so that said frictional braking force is dependent upon the fluid pressure admitted to said means for engaging the braking members, means for supplying gaseous fluid under pressure to said means for engaging said braking members with said brake drum and including pressure regulating means, said pressure regulating means including a valve movable to vary the flow of said fluid and means for continuously bleeding said fluid from said supplying means beyond said valve so that any fluid pressure being supplied by said supplying means may be reduced by a movement of said valve, the connecting means between at least one of said braking members and said anchoring means including two parts which are relatively movable in one direction by said reaction to the braking force, spring means continuously exerting a predetermined force acting against said two parts and tending to cause relative movement of the latter in the opposite direction, and means actuating said pressure regulating means in response to relative movement of said two parts in said one direction against said predetermined force so that the fluid pressure supplied to said means for engaging the braking members with the brake drum is automatically regulated to maintain a substantially constant braking force corresponding to said predetermined force exerted by said spring means.

3. In a machine having a heavy rotary part, the combination of a brake drum rotatable with said rotary part, a brake band extending arcuately over and frictionally engageable with the periphery of said brake drum to exert a frictional braking force for decelerating said drum and heavy rotary part, fixed anchoring means, air pressure operated means connected to one end of said band for applying a force to said band to engage said band with said drum so that said frictional braking force is dependent upon the air pressure admitted to said pressure operated means, means interconnecting the other end of said band and said anchoring means so that the latter absorb a reaction force equal to the sum of said braking force and a component of the said applied force, means for supplying air under pressure to said pressure operated means and including pressure regulating means, said interconnecting means including two parts which are relatively movable in one direction by said reaction force, adjustably yieldable means continuously exerting a predetermined force resisting said relative movement of said two parts in said one direction by said reaction force, and means actuating said pressure regulating means in response to relative movement of said two parts against said predetermined force so that the pressure of the air supplied to said pressure operated means is automatically regulated to maintain said reaction force at a substantially constant value corresponding to the magnitude of said predetermined force conitnuously exerted by said yieldable means whereby as the friction between said drum and said band varies the said applied force is compensatingly varied to maintain a desired magnitude of said braking force.

4. In a machine having a heavy rotary part, the combination of a brake drum rotatable with the rotary part, brake bands having friction linings engageable with said drum to exert a frictional braking force for decelerating said drum and heavy rotary part, fixed anchoring means, connecting means between said brake bands and said anchoring means effective to transmit the reaction to said braking force to said anchoring means, cylinders also connected to said anchoring means and having pistons slidable therein, means connecting said pistons to said brake bands so that the latter are urged into engagement with said brake drum upon the admission of compressed air to said cylinders and said frictional braking force depends on the pressure of the compressed air admitted to said cylinders, means for supplying compressed air to said cylinders including pressure regulating means for each of said cylinders, the connecting means between each brake band and said anchoring means including two parts which are relatively angularly movable in one direction by the reaction to the braking force exerted by the related brake band, adjustably yieldable means resisting the relative angular movement of said two parts in said one direction, and means actuating each pressure regulating means in response to relative angular movement of said two parts of the connecting means of the brake band operated by the cylinder with which the pressure regulating means is associated so that the pressure of the compressed air supplied to each cylinder is automatically regulated to maintain a substantially constant braking force by the related brake band as determined by said adjustably yieldable means.

5. In a machine having a heavy rotary part, the combination of a brake drum rotatable with the rotary part, a brake band having a friction lining engageable with said drum to exert a frictional braking force for decelerating said drum and heavy rotary part, fixed anchoring means, connecting means between one end of said brake band and said anchoring means effective to transmit the reaction of said band to said braking force to said anchoring means, a cylinder anchored by fixed means and having a piston slidable therein, means connecting said piston to the other end of said brake band so that said band is urged into engagement with said brake drum upon the admission of compressed air to said cylinder and said frictional braking force depends on the pressure of the compressed air admitted to said cylinder, means for supplying compressed air to said cylinder including pressure regulating means, said connecting means between said brake band and said anchoring means including two pivotally interconnected parts which are relatively angularly displaceable in one direction by said reaction, adjustable spring means tending to angularly displace said two parts relative to each other in the opposite direction, and means actuating said pressure regulating means in response to relative angular displacement of said two parts in said one direction so that the pressure of the compressed air supplied to said cylinder is automatically regulated to maintain a substantially constant braking force determined by the adjustment of said spring means.

6. In a machine having a heavy rotary part, the combination of a brake drum rotatable with the rotary part, brake bands having friction linings engageable with said drum to exert a frictional braking force for decelerating said drum and heavy rotary part, fixed anchoring means, connecting means between said brake bands and said anchoring means effective to transmit the reaction to said braking force to said anchoring means, cylinders also connected to said anchoring means and having pistons slidable therein means connecting said pistons to said brake bands so that the latter are urged into engagement with said brake drum upon the admission of compressed air to said cylinders and said frictional braking force depends on the pressure of the compressed air admitted to said cylinders, means for supplying compressed air to said cylinders including a compressed air supply line with a valve interposed therein and having a movable valve plunger which serves to decrease the pressure of the compressed air supplied to the cylinders in accordance with the displacement of said plunger, the connecting means between at least one of said brake bands and said anchoring means including two parts which are relatively movable by said reaction to the braking force, resilient means resisting the relative movement of said two parts by said reaction to the braking force so that said relative movement occurs only when the braking force has attained a predetermined value, and actuating means for said valve operative to displace said plunger in accordance with the relative movement of said two parts so that the pressure of the compressed air supplied to said cylinders is automatically regulated by said valve to maintain a substantially constant predetermined braking force.

7. In a machine having a heavy rotary part, the combination of a brake drum rotatable with the rotary part, brake bands having friction linings engageable with said drum to exert a frictional braking force for decelerating said drum and heavy rotary part, fixed anchoring means, connecting means between said brake bands and said anchoring means effective to transmit the reaction to said braking force to said anchoring means, cylinders also connected to said anchoring means and having pistons slidable thereof, means connecting said pistons to said brake bands so that the latter are urged into engagement with said brake drum upon the admission of compressed air to said cylinders and said frictional braking force depends on the pressure of the compressed air admitted to said cylinders, means for supplying compressed air to said cylinders including a compressed air supply line with a valve interposed therein and having a movable valve plunger which serves to progressively decrease the pressure of the compressed air supplied to the cylinders in accordance with the displacement of said plunger, the connecting means between at least one of said brake bands and said anchoring means including two parts which are relatively movable by said reaction to the braking force, resilient means resisting the relative movement of said two parts by said reaction so that said relative movement occurs only when the braking force has attained a predetermined value, said valve being mounted on one of said two relatively movable parts, and actuating means carried by the other of said two parts and engageable with said plunger to displace the latter in response to relative movement of said two parts by said reaction so that the pressure of the compressed air supplied to said cylinder is automatically regulated to maintain a substantially constant predetermined braking force.

8. In a machine having a heavy rotary part, the combination of a brake drum rotatable with the rotary part, fixed brake support studs disposed at diametrically opposed locations alongside said drum, brake bands extending between said studs and frictionally engageable with said drum, connecting means between each stud and the brake band extending therefrom in the direction of rotation of said drum, fluid pressure operated means mounted on said studs and connected to said brake bands for applying the latter against said drum so that a frictional braking force is developed for decelerating said drum and heavy rotary part, the connecting means between at least one of said brake bands and the related brake support stud including a first part mounted on said stud, a second part, means connecting said second part to the adjacent end of said one brake band and having a pivoting axis in said second part which, with the axis of said related stud, lies in a plane parallel to the tangent to said drum at said adjacent end of said one brake band so that the reaction to said braking force acts in said plane and means pivotally interconnecting said first and second parts for relative angular displacement about an axis which is spaced laterally from said plane so that said reaction to the braking force tends to cause relative angular displacement of said first and second parts, adjustable spring means resisting the relative angular displacement of said first and second parts by said reaction to the braking force so that the extent of the relative angular displacement of said first and second parts is a measure of said reaction to the braking force, means for supplying fluid under pressure to said fluid pressure operated means including pressure control means, and actuating means responding to the relative angular displacement of said first and second parts to actuate said pressure control means so that the braking force is maintained substantially constant at a predetermined value.

9. In a machine having a heavy rotary part, the combination as in claim 8; wherein said pressure control means includes a valve having a body mounted on one of said parts and an operating plunger projecting from said body and movable relative to the latter to vary the pressure of the fluid supplied to said fluid pressure operated means; and wherein said actuating means includes an abutment member carried by the other of said parts and engageable with said plunger to move the latter relative to said body upon relative angular displacement of said parts.

10. In a machine having a heavy rotary part, the combination as in claim 8; wherein said fluid pressure operated means include cylinders connected to said studs, pistons slidable in said cylinders and connected to the related brake bands and springs acting on said pistons to urge the latter in the direction for releasing the brake bands; and wherein said means for supplying fluid under pressure includes compressed air conduit means opening into said cylinders to supply compressed air to the latter at the sides of said pistons opposed to said springs, said pressure control means including means defining a restricted opening from said conduit means to the atmosphere, and a valve interposed in said conduit means to control the rate of flow of compressed air through the latter.

11. In a braking system for a heavy centrifugal machine having a shaft connected for rotation with the basket of the machine, a brake drum on said shaft and a friction device applicable to said drum to exert a braking force for decelerating the basket from a high speed of rotation during successive braking periods at frequent intervals; the combination of fluid pressure operated means connected with said friction device for applying the latter to exert a braking force depending upon the pressure of fluid supplied to said applying means, a source of gaseous fluid under a pressure in excess of that required in said applying means to cause said friction device to exert a desired braking force, conduit means extending from said source to said applying means for conducting fluid pressure to the latter, brake operating cut-off valve means interposed in said conduit means and being movable between open and closed positions to admit said fluid to and cut-off said fluid from said applying means, regulating means in said conduit means beyond said valve means for throttling the flow of said fluid to said applying means and thereby regulating the braking force when said valve means is in said open position, means for continuously bleeding said fluid from said conduit means at a point beyond said regulating means, means connected to said friction device to absorb the reaction of said device to said braking force and including two interconnected parts which are relatively movable in one direction by said reaction and preloaded spring means continuously exerting a predetermined force resisting relative movement of said two parts in said one direction and of a magnitude corresponding to said desired braking force, and means responding to relative movement of said two parts and correspondingly actuating said regulating means so as to maintain the braking force substantially constant at said desired value during successive braking periods.

References Cited in the file of this patent

UNITED STATES PATENTS

| 2,152,489 | Lamb | Mar. 28, 1939 |
| 2,279,433 | Logan | Apr. 14, 1942 |
| 2,535,854 | Hertrich | Dec. 26, 1950 |
| 2,736,394 | Hewitt | Feb. 28, 1956 |
| 2,849,086 | Martin | Aug. 26, 1958 |